C. L. CAMPBELL.
METHOD AND APPARATUS FOR OBTAINING WOOD ALCOHOL AND CALCIUM ACETATE FROM ACETATE LIQUOR.
APPLICATION FILED JAN. 3, 1912.
1,192,987.
Patented Aug. 1, 1916.
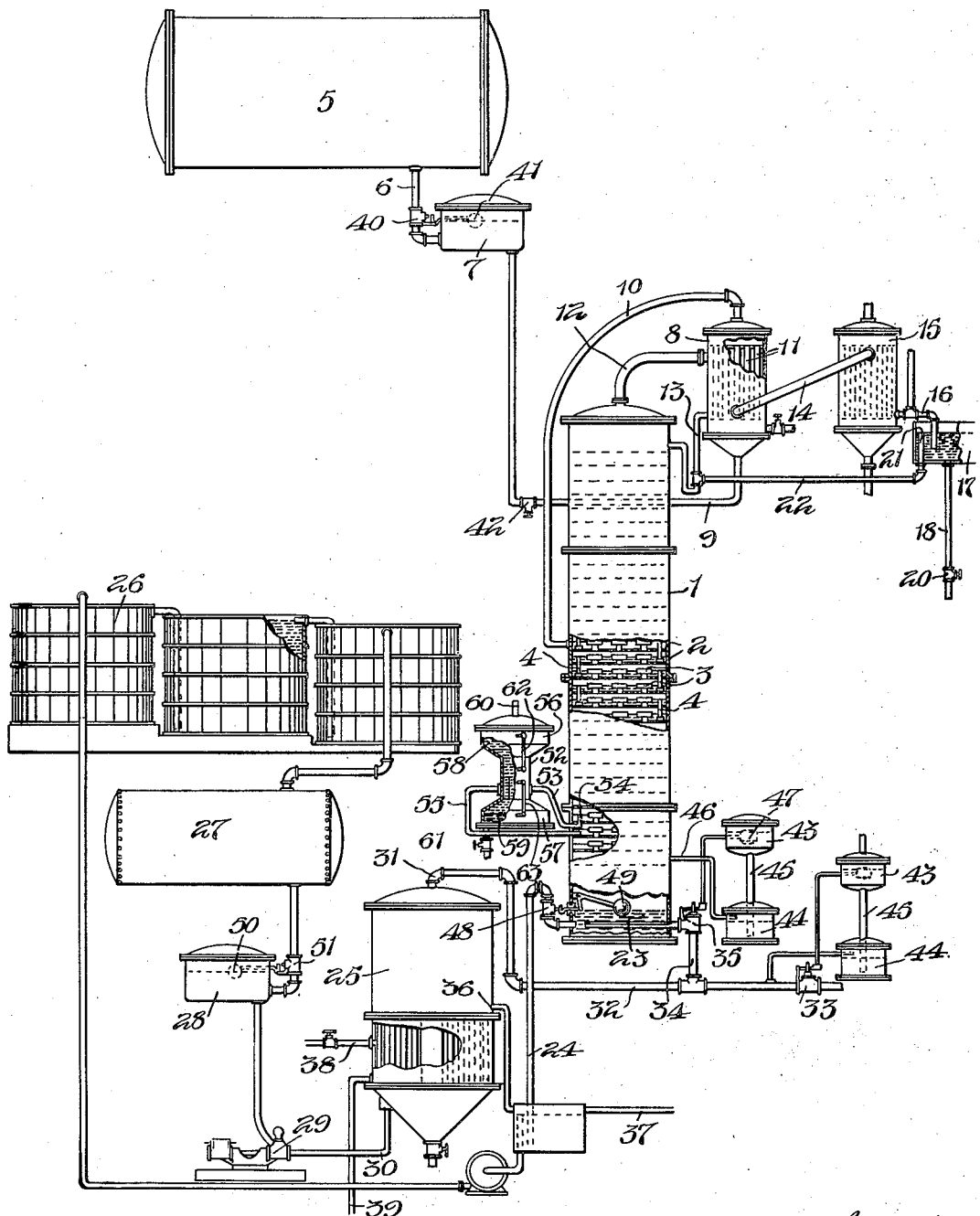

UNITED STATES PATENT OFFICE.

CHARLES LINCOLN CAMPBELL, OF BOSTON, MASSACHUSETTS, ASSIGNOR TO E. B. BADGER & SONS COMPANY, OF BOSTON, MASSACHUSETTS, A CORPORATION OF MASSACHUSETTS.

METHOD AND APPARATUS FOR OBTAINING WOOD-ALCOHOL AND CALCIUM ACETATE FROM ACETATE LIQUOR.

1,192,987.      Specification of Letters Patent.      Patented Aug. 1, 1916.

Application filed January 3, 1912. Serial No. 669,159.

*To all whom it may concern:*

Be it known that I, CHARLES LINCOLN CAMPBELL, of Boston, in the county of Suffolk and State of Massachusetts, have invented certain new and useful Improvements in Methods and Apparatus for Obtaining Wood-Alcohol and Calcium Acetate from Acetate Liquor, of which the following is a specification.

The present invention relates to a method, and an apparatus used in carrying out such method, of recovering by-products derived from the distillation of wood, and particularly of separating wood alcohol and calcium acetate from a solution derived from wood distillation, purifying the alcohol and acetate, and concentrating the latter.

The invention consists first in a series of steps or operations performed upon crude liquor containing calcium acetate and wood alcohol in solution, carried on continuously and in such sequence as to remove the wood alcohol from the solution, purify the remaining solution, concentrate the calcium acetate, and employ the vapors delivered in the step of concentration of the acetate, in regulated amounts, to furnish heat for distilling the alcohol from the solution.

The invention further consists in an apparatus capable of utilization in carrying out the above described method.

Such apparatus in one of its possible embodiments is illustrated in the accompanying drawings.

Before proceeding to a detailed description of my present invention I deem it advisable to state briefly the preliminary steps which result in the production of the crude liquor to be treated according to my invention. In the distillation of wood a liquor is obtained which is called "acid liquid" and contains among other ingredients a certain amount of wood alcohol, acetate acid, acetone, tar, oils and water. This liquor is first treated to remove the tar, by settling and distillation, and is then neutralized with lime. After the neutralization the liquor is a dilute solution of calcium acetate and wood alcohol, with impurities, including oils. Such liquor is the crude material which I treat by my method and apparatus. In the following description of the invention I shall refer to this liquor for the purpose of brevity of description either as the crude liquor, or as the acetate liquor in place of designating it in each instance as a solution containing calcium acetate and wood alcohol. Having made this preliminary explanation I will now proceed to a detailed description of the apparatus and the method in the use of which the apparatus is employed.

1 represents a distilling column or still which is constructed according to known principles so that it may act continuously, and consists of an outer shell and internal plates or partitions 2 having boiling caps 3 through which steam and vapors may pass in intimate contact with the liquor on the plates, and overflow pipes 4 for conducting an excess of liquor on each plate to the plate below.

The crude material to be treated in the still, which, as above stated, consists of a solution of calcium acetate mixed with wood alcohol, is contained in a tank or reservoir 5 from which it passes to the column through a pipe 6 and regulator 7. The flow from the regulator to the column may be direct, or it may occur through a separator 8 so called, the function of which is to separate the higher and lower proof vapors delivered from the column. When the crude liquor passes through the separator it serves the purpose of cooling and condensing part of the vapors and is itself given a preliminary degree of heating. For the purpose of illustration I have herein shown the crude liquor as passing from the regulator 7 through a pipe 9 to the separator 8, and thence through a pipe 10 to the column. The separator has a construction suitable for producing a thermal contact between fluids while keeping them out of physical contact. It may be made as a condenser having tubes 11 through which the cooling fluid passes and around which the vapors flow. The distilled vapors are delivered from the top of the column to the separator through a pipe 12 entering the separator at the upper part thereof. The liquid produced by condensation in the separator returns through a pipe 13 to the column. The point at which this pipe enters the column may be near any of the plates near the top of the same, according as may be necessary to get the best results.

The vapors remaining uncondensed in the separator pass through a conduit 14 to a condenser 15 in which all the vapors are condensed by thermal contact with a cooling liquid, usually water. The condensed liquid is drained off through a pipe 16 which discharges into a tank 17 having an outlet pipe 18 controlled by a valve 20. In the tank is an overflow pipe 21 which is connected by means of a conduit 22 with the return pipe 13 previously mentioned.

The liquids of relatively higher boiling points accumulate on the plates of the column, descending from plate to plate through the overflows until they finally arrive at the bottom of the column, where they accumulate as indicated at 23. As all the alcohol has been removed from the liquid by the distillation, and the oils have also been removed by a means which I will presently describe, what finally accumulates at the bottom of the column is calcium acetate solution, which is comparatively pure except for matter in the nature of sediment carried in suspension. This liquid is drawn off through a pipe 24 and eventually enters an evaporating vessel 25. It is ordinarily desirable, however, before admitting this liquid to the evaporating vessel to clear it of sediment, and it is accordingly pumped into a settling tank 26, whence it overflows into other tanks, and finally into a reservoir 27, from which it passes first through a hydrostatic head controller 28 and then through a force pump 29 to the evaporator, to which it is conducted by a pipe 30.

The evaporator is conveniently provided with tubes in which the acetate liquor is contained, and around which steam or other heating agent is circulated. Any construction, however, which provides a thermal contact between the liquor and the heating agent is within the scope of the invention. The liquor is boiled in the evaporator and the steam produced by the boiling of the liquor passes off at 31 and is carried away by a pipe 32 in which there is a relief valve 33, and from which a branch 34 controlled by a valve 35 leads to the distilling column.

The concentration of the liquid in the evaporator is carried almost to the point of crystallization and the concentrated liquor is continuously drawn off at the point 36 through a pipe 37 which conducts it to evaporating pans in which it is allowed to crystallize and dry.

From the foregoing it will be understood that there is a continuous admission of crude liquor to the distilling column, a continuous outflow of alcohol therefrom, a continuous delivery of calcium acetate free from alcohol, a continuous concentration of the acetate solution, a continuous delivery of the concentrated solution, and a continuous return of water vapor from the concentrator to the column, which vapor furnishes the heat and pressure for causing ebullition and distillation of the liquor. There is ordinarily an excess of vapor given off from the concentrator over what is necessary for the operation of the distilling column, hence no other supply of steam for the column is necessary than the concentrator, and the excess from the latter is carried past the valve 33 and utilized for any other desired purpose. The steam required to boil the liquor in the concentrator is supplied by a pipe 38, and the condensate is carried off through a drain 39.

It is necessary in order to secure economical results from a continuous system such as I have described that the same should be operated uniformly and with practically no variations or irregularities such as would be caused by variation in any of the factors which affect the operation, such as the temperature of the crude liquor, the alcohol content of the crude liquor, and the pressure of the heating vapors from the concentrator, and percentage of calcium acetate in the original solution. Accordingly an important part of my invention resides in the fact that I provide the apparatus with regulating or compensating devices either automatic or controlled by manipulation, for maintaining constant conditions in spite of variation in the above factors. Any means whatever for effecting regulation of the factors above mentioned comes within the scope of my invention, broadly considered, but there are certain particular devices which are better suited to the purpose than others, and in order to complete my illustration of a complete and operative apparatus I have chosen certain of such devices for detailed description and illustration in the drawings. The first of these regulations which I will describe is the regulator for the feed of crude liquor to the column, whereby the head under which the liquor is forced into the column is maintained constant, to secure uniformity in the rate of admission of the crude liquor. As a preliminary it should be understood that if a pump is not employed for forcing the crude liquor into the column, the supply should be located at such a height above the admission point to the column as to provide a sufficient hydrostatic head to overcome the internal pressure in the column. The liquid feed regulator which I am about to describe is used where the liquid is admitted under its own head. The regulator consists essentially of the tank 7 previously described, into which the pipe 6 discharges, a valve 40 in the pipe 6, a float 41 or other device controlled by the liquid in the tank 7 for regulating valve 40, and a manually regulated valve 42 in the pipe 9. The particular type of float 41 and float-controlled valve is not material and I may use any one of the many forms now on the market. The essential point is that the valve 40 is automatically controlled to maintain a constant level of liquid in the vessel 7, whatever may be the extent of opening the valve 42. Thereby the head tending to force the liquor into the column is constant, regardless of the quantity of liquor in the supply tank 5.

The next regulating device which I will describe is that which automatically regulates the pressure of vapors admitted to the bottom of the distilling column. This regulator controls the valve 35 previously mentioned. It consists of two chambers or vessels 43 and 44, one above the other, which are connected by a pipe 45, said pipe extending nearly to the bottom of the lower vessel. The latter vessel is connected with the column by a pipe 46. A float 47 in the vessel 43 controls the valve 35, opening the valve when lowered and closing it when raised. The vertical distance between the two vessels is approximately equal to the hydrostatic head corresponding to the pneumatic pressure in the column. Consequently the liquid level in the chamber or vessel 43 is maintained by this pressure and fluctuates sensitively in accordance with changes in the pressure so as instantly to open or close the valve 35 to a greater or less extent. The pressure in the column, of course, bears a known relation to the temperature of the contained vapors. If the incoming liquor should be too cool, for instance, the pressure would diminish in consequence of a diminution of the temperature and greater condensation of the vapors in the column, whereupon the regulator would open the valve 35 and admit more vapor. A contrary effect occurs when the temperature of the incoming liquor rises. By means of this regulator variations in temperature of the incoming liquor are provided for, and at the same time the pressure in the column is maintained constant. This regulator is of the utmost importance, as its ultimate effect is to save all of the alcohol and keep the delivered alcohol from being too weak. If the pressure and temperature in the column should decrease, the vapors of alcohol leaving the column would be unnecessarily strong, indicating that not all of the alcohol is extracted and that some of it is being wasted in the liquor which leaves the column. On the other hand, if the pressure and temperature were too high, the alcohol would be weak.

A third regulator serves to compensate for differences in alcoholic strength of the crude liquor. This regulator consists of the tank 17, the overflow pipe 21, and the valve 20 in the discharge pipe 18. This regulator provides means whereby more or less of the condensed alcohol may be returned to the upper portion of the column to supplement that returned from the separator 8, and thereby enrich to a greater or less extent the vapors delivered from the column. It is understood by those familiar with this art that the vapors condensed in the separator 8, although less rich than those which remain uncondensed, are richer than the liquid remaining on the upper plates of the column. This condensate returning enriches the liquid on the upper plates. In case the crude material is insufficiently rich to furnish sufficiently high proof alcohol in the condenser 15, even after condensation of lower proof vapors in the separator, the quality can be enriched by return of a regulated amount from the tank 17 through the overflow and pipe 22. This is accomplished by closing the valve 20 more or less so that the rate of flow from the tank through the pipe 18 is less than the rate of flow into the tank from the condenser.

A fourth regulator is one for controlling the rate of flow of the calcium acetate from the bottom of the column. This may be a simple form of float valve consisting of a valve 48 in the pipe 24 and a float 49 supported by the liquor in the bottom of the column, and so connected to the valve that in rising it opens the valve and in falling closes the same. This regulator permits delivery of the calcium acetate solution from the column only as fast as it is delivered free from alcohol.

A fifth regulator is provided to govern the relief valve 33. This regulator may be specifically like the regulator for the valve 35 already described in detail, consequently its parts are designated by the same reference characters as those used in describing the first pressure regulator. The pressure pipe 46 for this relief valve regulator is connected to the pipe 32. The regulator is so adjusted that when the pressure in pipe 32 rises a slight amount above that required for the column, the relief valve is opened and the vapors are allowed to pass away.

The sixth and last regulator used in connection with this invention is one which governs the rate of flow of the calcium acetate liquor, to the concentrator or evaporator 25. This regulator is used whether the feed to the concentrator is by gravity or by a force pump. In either case the supply must be maintained at a constant head. The regulator is conveniently the same as that already described for the crude liquor supply, and consists of a tank 28 containing a float 50 connected to a valve 51.

I will now describe the device by which I effect removal of oils from the liquor in course of distillation. This device consists of a vessel or tank 52 to which the liquor is supplied by a pipe 53 which runs from the overflow pipe 54 of one of the plates near the bottom part of the column. That is, this overflow pipe, instead of discharging directly on to the next lower plate, discharges into the pipe 53 which conducts the liquor to the oil separator. A return pipe 55 conducts the liquor to the next lower plate. The oil separator has a great volume as compared with the capacity of the pipe 53, and in order to increase its area and to decrease the rate of flow to the greatest possible extent in those portions where the oil collects, it is enlarged in transverse area at the top 56 and bottom 57. The oils which are lighter than the liquor collect in the space 58 in the enlarged upper part, and those oils which are heavier collect at 59 in the enlarged lower part. The liquid in the separator is so nearly stagnant that ample time is given for the oils to separate. A suction pipe 60 and a drain 61 are provided for removing the oils at 58 and 59 when a sufficient accumulation has formed. Gage tubes 62 and 63 are provided for indicating the oil levels.

The height of the separator may be considerably in excess of the vertical distance between the plates of the distilling column, because the pressure in the latter is sufficient to support a considerable head of liquid. The part of the column with which the separator is connected is at a point considerably below the inlet for the crude liquor, and is also some distance above the outlet for the acetate liquor. This position is governed by the alcohol content of the liquor. In other words the liquor must be almost entirely free of alcohol before passing to the separator, since as the oils are soluble to some extent in alcohol, they will not separate completely enough if any appreciable amount of alcohol is present, and at the same time it is necessary that the return from the separator to the column should be so high that the liquor is again boiled before passing to the concentrator. A small proportion of the oils cannot be removed by settling, but such residual portion is entirely removed by distillation in the last few stages of the column.

I do not claim as my invention herein the distilling column, or broadly, a method of continuous distillation, for such columns have been heretofore used in the continuous distillation of other liquors containing alcohol. Neither do I claim any specific form of concentrator or of regulators for the various purposes heretofore described, for I intend to use any type of concentrator and regulator suitable for my purpose, as already set forth. The main things which I consider to be my invention, and novel, and which I desire to protect by Letters Patent, are a mode of treating acetate liquor containing alcohol, in accordance with which the liquor is supplied constantly, the alcohol is removed constantly, the calcium acetate is concentrated constantly, and the heat delivered from the acetate liquor during concentration is economically utilized for the removal of alcohol; and also a combination of mechanical elements forming an apparatus by the use of which the above method may be carried out. So far as I am aware the methods heretofore employed for separating wood alcohol from the crude liquor and concentrating calcium acetate have required a number of discontinuous distillations for first separating the alcohol from the liquor and then concentrating the same, and a separate boiling of the calcium acetate, each of these operations being independent of the others and requiring repeated and independent heatings. It has never heretofore been known that results not only similar to those ultimately obtained by the old process, but even superior, could be obtained by a continuous operation, and with the expenditure of about one-third the amount of heat heretofore required. It should be noted further in this connection that with my method the alcohol is not handled nor brought into contact with the air from the beginning to the end of the operation, and that therefore less of the volatile alcohol is lost. Further a uniform grade of product is obtained, great economies in space and labor cost effected, and a higher quality of alcohol is obtained than is possible with the crude systems hitherto employed.

In the following claims, the terms "crude material" or "crude liquor," or "acetate liquor" are intended to mean the liquor heretofore described obtained by neutralization with lime of the liquid produced from the distillation of wood (after distillation to remove tar, if necessary), and consisting of a dilute solution of calcium acetate containing wood alcohol with oils and other impurities.

I claim,—

1. The method of producing wood alcohol and concentrated calcium acetate which consists in continuously delivering liquor derived from distillation of wood, from which liquor tar has been removed and to which lime sufficient to neutralize the contained acetate has been added, to a distilling apparatus, continuously removing vapors of alcohol from one part of such apparatus, continuously removing the liquor freed of alcohol from another part of the apparatus, heating and concentrating such liquor, and returning the vapors produced by such heating of the liquor to the distilling apparatus to furnish the heat required for distillation.

2. The method of producing wood alcohol and concentrated calcium acetate which consists in continuously delivering liquor derived from distillation of wood, from which liquor tar has been removed and to which lime sufficient to neutralize the contained acetate has been added, to a distilling apparatus, continuously removing vapors of alcohol from one part of such apparatus, continuously removing the liquor freed of alcohol from another part of the apparatus, allowing the liquor to stand for the purpose of allowing impurities to settle, then heating and concentrating the liquor, and continuously returning the vapors thereby delivered from the liquor to the distilling apparatus so as to furnish heat for distillation.

3. The method of producing wood alcohol and concentrated calcium acetate which consists in continuously delivering liquor derived from distillation of wood, from which liquor tar has been removed and to which lime sufficient to neutralize the contained acetate has been added, to a distilling apparatus, continuously removing vapors of alcohol from one part of such apparatus, continuously removing the liquor freed of alcohol from another part of the apparatus, heating and concentrating such liquor, continuously returning the vapors produced by such heating to the distilling apparatus to furnish heat for distillation, and continuously withdrawing the concentrated calcium acetate solution.

4. A method for the purpose described, comprising the steps of continuously distilling liquor resulting from distillation of wood, after removal of tar and neutralization with lime, with continuous removal of vapors of alcohol and retention of residual calcium acetate solution, supplying regulated continuous flow of crude liquor to the body of liquor in course of distillation, heating a body of calcium acetate solution, continuously supplying such solution from the residual products of distillation to said body and continuously removing concentrated solution from the body, and applying the heated vapors expelled from the solution undergoing concentration to the liquor being distilled, and regulating the quantity and pressure of the vapors so delivered in accordance with the temperature and pressure of the liquor being distilled.

5. A method of treating so-called acetate liquor to obtain wood alcohol having a determined strength and concentrated calcium acetate solution, which consists in supplying such liquor at a regulated constant rate, to a body of the liquor undergoing distillation, removing vapors of distillation from such body, condensing such vapors, returning a part of the condensate to the liquor being distilled, removing oils from the liquor continuously during distillation, simultaneously heating a body of calcium acetate solution, delivering a regulated continuous quantity of dilute calcium acetate solution from the body being distilled to that being concentrated, continuously delivering concentrated calcium acetate solution from the latter body, delivering heated vapors from the latter body to the first-named body, and automatically regulating the amount and pressure of the vapors so delivered.

6. A method of separating, purifying and concentrating wood alcohol and calcium acetate contained in the so-called acetate liquor of commerce, which consists in feeding the said liquor constantly to a continuous distilling column, taking alcohol vapors from the top of the column, condensing and returning a part of such vapors to the upper portion of the column, continuously withdrawing the residual liquor from an intermediate point of the column and allowing it to settle to remove oils, returning the liquor to the column, subjecting such return liquor to a limited distilling action to drive off the residue of oils, then continuously feeding the residual acetate solution to a concentrator, and continuously withdrawing concentrated solution therefrom.

7. The method of producing wood alcohol and calcium acetate from the lime-neutralized crude liquor of wood distillation, which consists in distilling such liquor, continuously feeding the crude liquor to the still, continuously removing vapors of alcohol from the top of the still, continuously delivering the residual calcium acetate solution from the bottom of the still to a concentrator, continuously removing the concentrated solution from said concentrator, and continuously returning vapors from the concentrator to the still.

8. The method of treating so-called acetate liquors containing wood alcohol and alkali acetate which consists in continuously supplying such liquor to a distilling apparatus, continuously removing alcoholic vapors from the top of such apparatus, continuously removing liquid free from alcohol from the bottom of such apparatus, causing such liquid to stand to permit settling of sediment, then concentrating such liquid by boiling, passing the vapors generated from such liquid thereby into the distilling apparatus to furnish the heat required for distillation, and continuously withdrawing the concentrate of such liquid.

9. The method of obtaining alcohol and calcium acetate from liquor containing such alcohol and acetate in dilute solution, which consists in distilling the liquor, withdrawing the alcoholic vapors delivered by such distillation, concentrating the residual liquor by heat, utilizing the vapors produced by such concentration to furnish the heating of distillation, and drawing off the concentrated acetate liquor, the steps of such treatment being carried on in a continuous operation.

10. The method of treating so-called acetate liquors containing wood alcohol and calcium acetate to obtain wood alcohol and calcium acetate, which consists in continuously supplying such liquor to a continuous distilling apparatus, withdrawing the partially distilled liquor continuously, causing such liquor to become stagnant to permit the oils to separate therefrom, returning the liquor to the distilling apparatus, and subjecting the liquor to further distillation.

11. An apparatus of the character indicated, comprising a distilling column having a vapor outlet in its upper part and a liquid outlet in its lower part, means for admitting liquor for distillation to said column at a point between the heights of such outlets, an oil separator, connections leading from the column to the separator and return at points respectively one above the other between the heights of the liquor inlet and the solution outlet, a concentrator, and means for conducting the residual solution from the lower outlet of the column to the concentrator.

12. An apparatus of the character described, comprising a distilling column having a vapor outlet, and including in its construction superposed evaporating partitions or plates, a condenser to which the vapor is conducted, means for returning a regulated quantity of the condensed alcohol to the upper portion of the column, means for conducting crude liquor to the column at a point below the vapor outlet, automatic means for maintaining such liquor under uniform pressure, a concentrator, a connection from the column to the concentrator for conducting the residual solution from the former to the latter, means for conducting heated vapors from the concentrator to the column, and a regulator automatically controlled by the pressure in the column for governing the rate of flow of the vapors into the latter.

13. An apparatus for the purpose indicated comprising a distilling column having a vapor outlet, means for continuously admitting liquor to be distilled to a point in the column below the vapor outlet, an oil separator, connections to said separator leading from the column at a point below the admission point for the liquor, a return connection from the separator to the column, an outlet for the residual solution, located at a point in the column below said return connection, a concentrator to which the solution is delivered from the last-named outlet, and means for delivering a regulated quantity of vapors delivered from the concentrator to the lower part of the column.

14. In an apparatus for treating so-called acetate liquors containing wood alcohol and calcium acetate, the combination with a distilling column having transverse partitions, openings through such partitions through which the vapors of distillation may pass, and overflow pipes from said partitions, an oil separator, a connection to said separator from the overflow pipe of one of said partitions, whereby the liquor passing from said partition is caused to flow to the separator instead of to the next partition, and a return pipe from the separator to said next partition.

15. In an apparatus for treating so-called acetate liquors containing wood alcohol and calcium acetate, the combination with a distilling column having transverse partitions, openings through such partitions through which the vapors of distillation may pass, and overflow pipes from said partitions, an oil separator, a connection to said separator from the overflow pipe of one of said partitions, whereby the liquor passing from said partition is caused to flow to the separator instead of to the next partition, and a return pipe from the separator to said next partition, the partitions from which the liquor is withdrawn and to which the liquor is returned, respectively, being intermediate the points in the still at which the distilled vapors are removed and the residual liquid collects.

16. In an apparatus for treating so-called acetate liquors containing wood alcohol and calcium acetate, the combination with a continuous distilling apparatus of an oil separator having spaces in its upper and lower parts for collection of oils, respectively, lighter and heavier than the liquor being distilled, means for compelling the liquor collecting at a specified point of the column to flow into said separator, and means for conducting the liquor from the separator to a point in the column adjacent to and below the point before named.

In testimony whereof I have affixed my signature, in presence of two witnesses.

CHARLES LINCOLN CAMPBELL.

Witnesses:
P. W. PEZZETTI,
J. M. MURPHY.